United States Patent
Kusuyama (10) Patent No.: US 7,833,089 B2
(45) Date of Patent: Nov. 16, 2010

(54) OPTICAL LENS PREFORM, OPTICAL LENS, AND METHOD OF MAKING OPTICAL LENS

(75) Inventor: Yutaka Kusuyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 349 days.

(21) Appl. No.: 11/987,327

(22) Filed: Nov. 29, 2007

(65) Prior Publication Data

US 2008/0088948 A1    Apr. 17, 2008

Related U.S. Application Data

(62) Division of application No. 10/476,937, filed as application No. PCT/JP02/04498 on May 8, 2002, now Pat. No. 7,322,877.

(30) Foreign Application Priority Data

May 9, 2001    (JP) .............................. P2001-139230

(51) Int. Cl.
  *B24B 1/00*    (2006.01)
  *G02B 13/18*   (2006.01)
(52) U.S. Cl. ........................................ 451/42; 359/715
(58) Field of Classification Search .................. 451/41, 451/42, 43, 45, 54; 65/61, 64; 359/619, 359/708, 710, 718, 719, 741
See application file for complete search history.

(56) References Cited

U.S. PATENT DOCUMENTS

| | | | |
|---|---|---|---|
| 2,151,573 A | 3/1939 | Stanley | 350/410 |
| 4,986,939 A | 1/1991 | Hoffmann | 264/1.7 |
| 5,004,328 A | 4/1991 | Suzuki et al. | 350/416 |
| 5,080,706 A * | 1/1992 | Snyder et al. | 65/102 |
| 5,081,639 A | 1/1992 | Snyder et al. | 372/101 |
| 5,155,631 A * | 10/1992 | Snyder et al. | 359/708 |
| 5,293,269 A * | 3/1994 | Burkhart et al. | 359/719 |
| 5,745,519 A | 4/1998 | Ruda et al. | 372/101 |
| 5,790,576 A | 8/1998 | Waarts et al. | 372/43 |
| 5,867,327 A | 2/1999 | Snyder | 359/710 |
| 6,155,911 A | 12/2000 | Mandler | 451/42 |

(Continued)

FOREIGN PATENT DOCUMENTS

EP    0 752 394 A2    1/1997

(Continued)

*Primary Examiner*—Maurina Rachuba
(74) *Attorney, Agent, or Firm*—Drinker Biddle & Reath LLP (57) ABSTRACT

The method for making an optical lens according to the present invention is characterized in comprising: a optical lens preform fabrication step of fabricating a optical lens preform which comprises a first curved portion which serves as an optically functioning part and which is on one side, a flat surface portion which is formed on the opposite side to the first curved portion, and paired beveling surfaces which are formed on the both sides of the flat surface portion; a drawing step of drawing a optical lens preform 40 until the optical lens preform 40 has obtained a desired outer diameter; and an optical lens fabrication step of cutting thus drawn optical lens preform and accordingly fabricating an optical lens. With this making method, since there are paired beveling surfaces disposed, it is possible to suppress a drawing-induced distortion.

2 Claims, 5 Drawing Sheets

U.S. PATENT DOCUMENTS

| | | | |
|---|---|---|---|
| 6,222,864 B1 | 4/2001 | Waarts et al. | 372/43 |
| 6,416,237 B2 | 7/2002 | Lissotschenko et al. | 385/88 |
| 6,621,632 B2 | 9/2003 | Zhou | 359/577 |
| 6,801,369 B2 * | 10/2004 | Kusuyama | 359/718 |
| 2001/0043779 A1 | 11/2001 | Lissotschenko et al. | 385/88 |
| 2002/0102071 A1 | 8/2002 | Lissotschenko et al. | 385/88 |
| 2002/0129621 A1 * | 9/2002 | Kusuyama | 65/61 |
| 2002/0191296 A1 | 12/2002 | Kusuyama | 359/619 |
| 2003/0021036 A1 * | 1/2003 | Kusuyama | 359/708 |

FOREIGN PATENT DOCUMENTS

| | | |
|---|---|---|
| GB | 2 108 483 A | 5/1983 |
| JP | 57-145040 | 9/1982 |
| JP | 57-169706 | 10/1982 |
| JP | 175739 | 10/1982 |
| JP | 57-181516 | 11/1982 |
| JP | 57-183328 | 11/1982 |
| JP | 58-168026 | 10/1983 |
| JP | 59-092935 | 5/1984 |
| JP | 63-008233 | 1/1988 |
| JP | 02-102134 | 4/1990 |
| JP | H5-502851 | 5/1993 |
| JP | 07-098402 | 4/1995 |
| JP | 07-287104 | 10/1995 |
| JP | 07-291651 | 11/1995 |
| JP | 8-240729 | 9/1996 |
| JP | 10-001321 | 1/1998 |
| JP | 10-096803 | 4/1998 |
| JP | 10-101246 | 4/1998 |
| JP | 10-101346 | 4/1998 |
| JP | 10-245236 | 9/1998 |
| JP | 10-330133 | 12/1998 |
| JP | H11-023806 | 1/1999 |
| JP | 3121614 | 1/2001 |
| JP | 2002/525699 | 8/2002 |
| JP | 2005-502851 | 1/2005 |
| WO | WO 92/06046 | 4/1992 |
| WO | WO 97/21126 | 6/1997 |
| WO | WO 01/35126 A1 | 5/2001 |
| WO | WO 01/35145 A1 | 5/2001 |
| WO | WO 01/35147 A1 | 5/2001 |
| WO | WO 02/090274 A1 | 11/2002 |

* cited by examiner

Fig.7 ns in response to light emitted from a light emitting ele-
OPTICAL LENS PREFORM, OPTICAL LENS, AND METHOD OF MAKING OPTICAL LENS This is a divisional application of copending application Ser. No. 10/476,937, having a §371 date of Nov. 6, 2003 now U.S. Pat. No. 7,322,877, which is a national stage filing based on PCT International Application No. PCT/JP 02/04498, filed on May 8, 2002. The copending application Ser. No. 10/476, 937 is incorporated by reference herein in its entirety.

TECHNICAL FIELD

The present invention relates to an optical lens which functions in response to light emitted from a light emitting element, a method for making an optical lens, and optical lens preform used for making of an optical lens by drawing thereof.

BACKGROUND ART

Japanese Patent No. 3121614 and British Patent No. GB2108483A disclose methods for making a micro lens by drawing. According to these making methods, a base material (a preform) which is shaped like a cylindrical column is manufactured, heated and drawn, whereby a cylindrical lens is obtained which has the same cross sectional shape as the preform.

DISCLOSURE OF THE INVENTION

Such conventional methods for making an optical lens have a defect that optically functioning parts which function in response to light are not fabricated as designed, because of distortion of the preform which develops during drawing.

In consideration of this problem, an object of the present invention is to provide an optical lens preform which allows to manufacture an optical lens to a desired design, a method for making an optical lens, and an optical lens.

To achieve the object above, a optical lens preform according to the present invention is a optical lens preform which is made of a transparent material and into the shape of a cylindrical column, comprising: a first curved portion which is formed on one side, a flat surface portion which is formed on the opposite side to the first curved portion, and paired beveling surfaces which are formed along a column axis direction on the both sides of the flat surface portion.

In the case of such optical lens preform, since there are paired beveling surfaces on the both sides of the flat surface portion, a drawing-induced distortion does not easily develop. The beveling surfaces herein used mean that surfaces which connect the ends of the first curved portion and the ends of the flat surface portion are located at least more on the inner side at least more than extension planes from the ends of the surfaces connected to the ends of the first curved portion and extension planes from the ends of the flat surface portion.

A optical lens preform according to the present invention is a optical lens preform which is formed by a transparent material and into the shape of a column, comprising: a first curved portion which is formed on one side; a second curved portion which is formed on the opposite side to the first curved portion and which has a smaller curvature than that of the first curved portion; and paired beveling surfaces which are formed along a column axis direction on the both sides of the first curved portion. The beveling surfaces herein used mean that surfaces which connect the ends of the first curved portion and the ends of the second curved portion are located at least more on the inner side at least more than extension planes from the ends of the surfaces connected to the ends of the first curved portion and extension planes from the ends of the second curved portion.

Since this optical lens preform comprises the second curved portion, it is possible to suppress a drawing-induced distortion better than where a flat surface is used.

In addition, since the paired beveling surfaces are formed in advance on the both sides of the second curved portion, a drawing-induced distortion does not easily develop.

The first curved portion is preferably formed by an aspheric surface. When the first curved portion is desirably formed by an aspheric surface, in a fabricated optical lens, it is possible to make effective use of a function outside the curved portion.

Further, since the first curved portion is formed by an aspheric surface whose curvature is larger than that of the second curved portion (or the first curved portion which is on the side where no flat surface portion) exists, a drawing-induced distortion does not easily develop at the aspheric surface, and therefore, it is possible to suppress damage to the aspheric shape.

As herein referred to, an "aspheric surface" and a "spherical surface" (which will be described later) are curved surfaces, such as a first curved portion 43 shown in FIG. 1, which are parallel to a column axis direction 20. Further, an "aspheric surface" refers to a curved surface which has at least two curvatures and whose curvature on the inner side of a curved portion is larger than the curvature on the outer side.

The second curved portion is preferably formed by a spherical surface. This allows to easily form the second curved portion. A "spherical surface" refers to a curved surface which has one curvature.

The second curved portion may be a convex curved surface. Alternatively, the second curved portion may be a concave curved surface.

The paired beveling surfaces are preferably formed as curved surfaces. This makes it possible to further suppress a deformation of the preform because of drawing.

A method for making an optical lens according to the present invention is characterized in comprising: a optical lens preform fabrication step of fabricating any one of the to-be-drawn optical lens preforms described above; a drawing step of drawing the optical lens preform fabricated at the optical lens preform fabrication step until the optical lens preform has obtained a desired outer diameter; and an optical lens fabrication step of cutting the to-be-drawn optical lens preform drawn at the drawing step and accordingly fabricating an optical lens, wherein the first curved portion of the optical lens preform drawn at the drawing step functions as an optically functioning part which functions in response to incident light or outgoing light.

A method for making an optical lens according to the present invention is characterized in comprising: a drawing step of drawing the to-be-drawn optical lens preform manufactured at the optical lens preform fabrication step until the optical lens preform has obtained a desired outer diameter; and an optical lens fabrication step of cutting the to-be-drawn optical lens preform drawn at the drawing step and accordingly fabricating an optical lens, wherein the first curved portion of the optical lens preform drawn at the drawing step functions as an optically functioning part which functions in response to incident light or outgoing light.

Since such a method for making an optical lens allows to determine the shape of the optical lens, and the shape of the optically functioning part in particular before carrying out drawing, it is possible to process in a sufficiently large size.

As herein referred to, "functions in response to light" means that incident divergent light is emitted after the angle of divergence of the light has been reduced. Meanwhile, to "cut" means to sever from a drawn optical lens preform and to grind into a desired shape and size.

An optical lens according to the present invention is characterized in that it is manufactured by any one of the methods for making optical lens described above.

The preform is processed in a sufficiently large size and a distortion of the optical lens preform is suppressed at the drawing step owing to the paired beveling surfaces, and hence, a fabricated optical lens is capable of accurately functioning in response to light.

Figure 7:
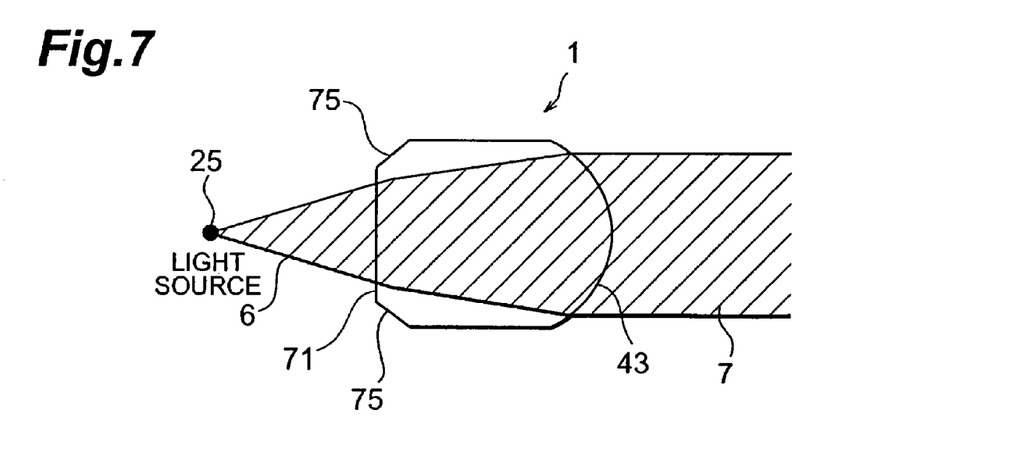
FIG. 7 is a drawing which shows an optical function of the optical lens according to the first preferred embodiment.

In this optical lens, it is desirable that light emitted from a semiconductor laser element impinges upon the side surface on which side the paired beveling surfaces exist, and the lens emits the light after functioning upon the light. In the event that the optical lens is used in response to a semiconductor laser element, an outer rim portion of a light incident surface is never used as an optically functioning part. As shown in FIG. 7, therefore, when the side surface on which side the paired beveling surfaces exist is used as a light incident surface, the existence of the paired beveling surfaces will not lead to a reduction in the lens effective area of the optical lens but instead makes it possible to effectively utilize the lens effective area of the optical lens (the area of the optically functioning part).

The present invention also aims at providing an optical lens preform which is formed by a transparent material, wherein a cross sectional shape along a flat surface which is orthogonal to a longitudinal direction is substantially constant, and the cross sectional shape is defined by a first curved line portion, a first linear line portion which is opposite the first curved line portion, a fourth and fifth linear line portions which extend parallel to each other from the both ends of the first curved line portion toward the first liner line portion, sixth and a seventh lines which connect one ends of fourth and fifth linear line portions to the ends of first linear line portion, and sixth and seventh lines are located closer toward the first curved line portion than extension lines from the both ends of the first linear line portion and extension lines from the one ends of the fourth and fifth linear line portions.

Another object of the present invention is to provide an optical lens preform which is formed by a transparent material, wherein a cross sectional shape along a flat surface which is orthogonal to a longitudinal direction is substantially constant, and the cross sectional shape is defined by a first curved line portion, a second curved line portion which has a smaller principal curvature than that of the first curved line portion and is opposite the first curved line portion, first and second linear line portions which extend parallel to each other from the both ends of the first curved line portion toward the second curved line portion, and third and fourth lines which connect one ends of the first and second linear line portions to the ends of the second curved line portion, and third and fourth lines are located closer toward first curved line portion than the extension lines from the both ends of second curved line portion and extension lines from the one ends of first and second linear line portions. A principal curvature herein referred to is a curvature of a circle obtained by approximating a curved line by a circle.

Another object of the present invention is to provide an optical lens which is formed by a transparent material, wherein a cross sectional shape along a flat surface which is orthogonal to a longitudinal direction is substantially constant, and the cross-sectional shape is defined by a first curved line portion, a second curved line portion which is opposite the first curved line portion, has a larger principal curvature than that of the first curved line portion and whose center of curvature is located outside the cross sectional shape, third and fourth curved line portions which extend from the both ends of the first curved line portion toward the second curved line portion, whose centers of curvature are located outside the cross sectional shape and which correspond to each other, and fifth and sixth curved line portions which extend from the ends of second curved line portion respectively toward the ends of third and fourth curved line portions and which are connected to the ends of third and fourth curved line portions, and the centers of principal curvatures of fifth and sixth curved line portions are located outside the cross sectional shape.

The principal curvature herein used is a curvature of a portion which forms a principal portion of a curved line portion.

BEST MODES FOR CARRYING OUT THE INVENTION

Preferred embodiments of the present invention will now be described in detail with reference to associated drawings. In the description below, identical or corresponding portions will be denoted with the same reference symbols, and redundant description will be omitted.

Figure 1:
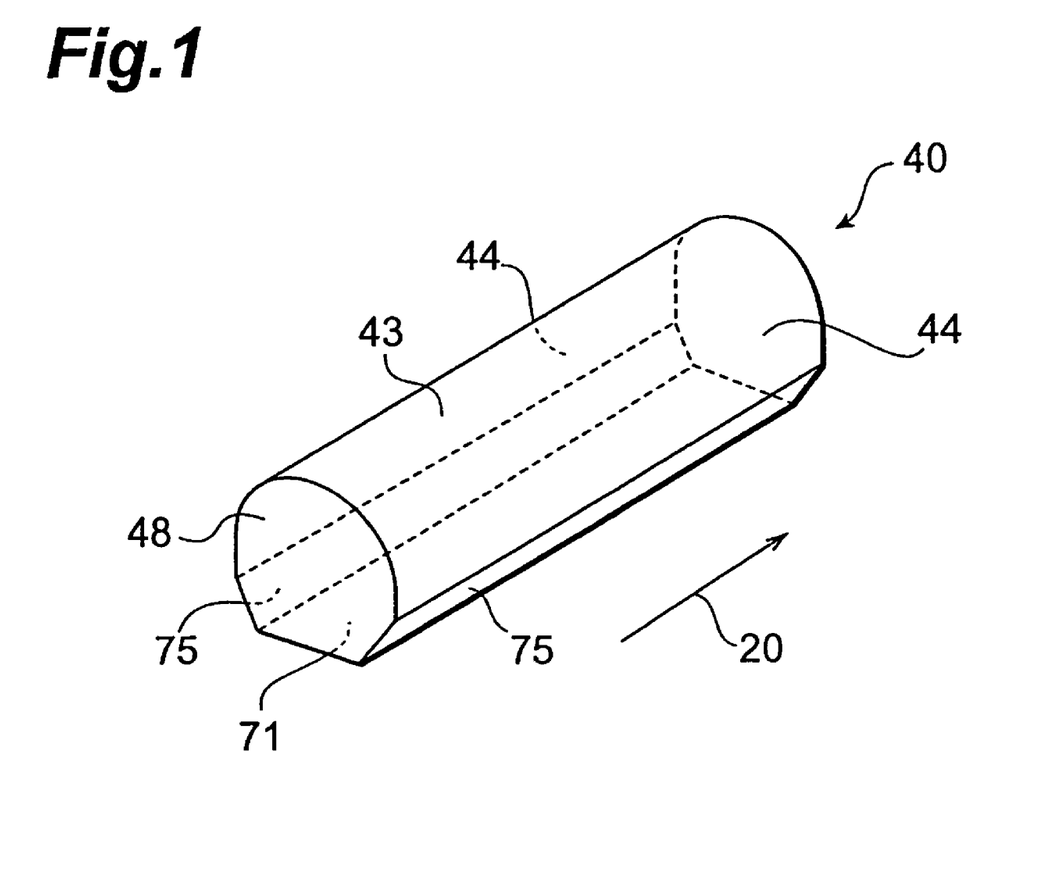
FIG. 1 is an overall view of a optical lens preform according to a first preferred embodiment.
Figure 2A:
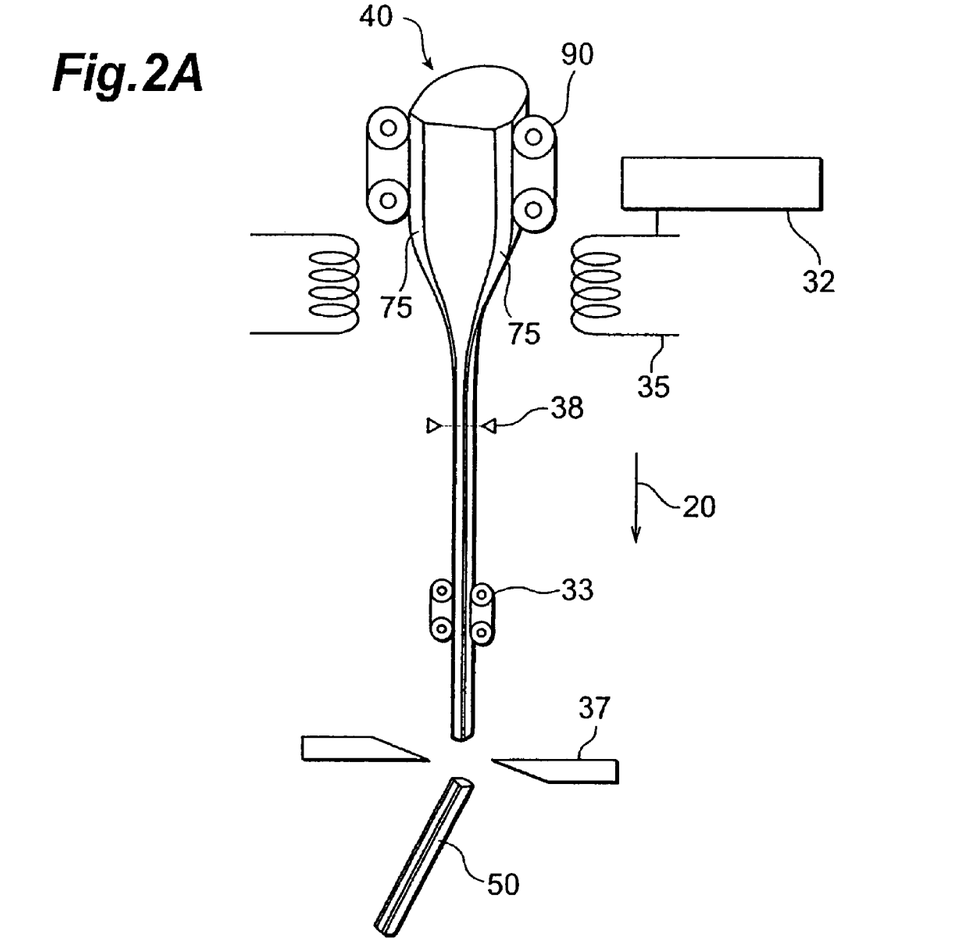
FIG. 2A and FIG. 2B are schematic drawings which show steps during a method for making an optical lens according to the first preferred embodiment.
Figure 2B:
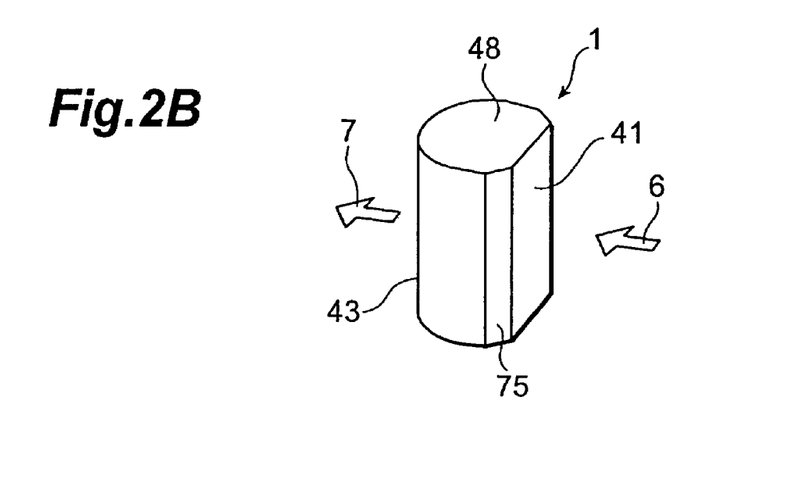

FIG. 1 is an overall view of a optical lens preform according to a first preferred embodiment. FIG. 2A and FIG. 2B are schematic drawings which show steps during a method for making an optical lens according to the first preferred embodiment.

A optical lens preform 40 is formed by a transparent glass material and into the shape of a column. On one side, a first curved portion 43 is disposed which is formed by a convex curved surface and parallel to a column axis direction 20, whereas on the other side (the side which is opposite to the first curved portion 43), a flat surface portion 71 is disposed. Paired side flat surface portions 44 formed by paired flat surfaces are disposed between the first curved portion 43 and the flat surface portion 71. On boundaries between the paired side flat surface portions 44 and the flat surface portion 71, there are paired beveling surfaces 75. The flat surface portion 71, the paired side flat surface portions 44 and the paired beveling surfaces 75 are all parallel to the column axis direction 20. The optical lens preform 40 is drawn along the column axis direction 20 as shown in FIG. 2A. Such a step of thus fabricating the optical lens preform 40 will be referred to as a optical lens preform fabrication step.

The first curved portion 43 is a portion which serves as an optically functioning part 43 of an optical lens 1 which is obtained by this making method, and is formed as an aspheric surface. When this portion is formed as an aspheric surface, there is an advantage that it is possible to make effective use of a function of the optically functioning part relative to incident light, and more particularly, a function outside the curved portion (i.e., an advantage that an aberration is eliminated). The first curved portion 43 which is formed by an "aspheric surface" does not provide a two-dimensional function but provides a one-dimensional function.

While formed as a flat surface when still a preform, the flat surface portion 71 could be distorted during drawing and deformed. Fabrication of the optical lens preform 40 is designed considering a rate of deformation of the flat surface portion 71 which could develop during drawing. With respect to the first curved portion 43, since the curvature of the first curved portion 43 is large, a drawing-induced distortion will not develop that intensively as in the flat surface portion 71.

The paired side flat surface portions 44 are formed parallel to each other. This permits easy arrangement work when these are arranged in contact with each other and in the form of an array.

The paired beveling surfaces 75 have a function of suppressing distortion and deformation developing during drawing as described later.

According to a method for making an optical lens utilizing a drawing process, it is possible to obtain the shape of an optical lens which is to be fabricated, and particularly, the shape of an optically functioning part at a stage that an optical lens is still the optical lens preform 40 which has a sufficiently large size (e.g., the width and the height are 2 through 6 cm and 20 through 200 cm), it is possible to carry out these works in a simple and accurate manner.

Japanese Patent Application Laid-Open Gazette No. H7-15521 discloses a method for making a refractive index distribution-type cylindrical lens (SELFOC lens) through drawing. According to this making method, used as a preform is a highly pure quartz glass-base rod which is obtained by increasing over multiple stages the volume of a fluorine dopant from the center toward the outside in a radius direction and accordingly reducing over multiple stages a refractive index, and this method does not use anything in which an optically functioning part is patterned in a preform as in the present invention. While such a conventional making method requires to dope fluorine by a method which uses an external plasma source or develop a refractive index distribution by ion exchange in which a preform is dipped in solvent salt for a long time at a preform fabrication step, the present invention does not demand such a step. Further, there also is a difference that in the thus obtained optical lens 1, a light incident surface and a light outgoing surface are not cylindrical curved side surfaces and that the both end portions are used instead as such.

Next, as shown in FIG. 2A, the optical lens preform 40 shaped at the optical lens preform fabrication step is heated up to or beyond a deformation point of the glass material in an electric furnace 35 or the like and drawn to a desired size (a drawing step). It is desirable that the electric furnace 35 is formed in a ring shape which surrounds the optical lens preform 40 and is capable of heating the optical lens preform 40 uniformly and equidistantly from around. A temperature adjuster apparatus 32 is connected to the electric furnace 35, so that it is possible to adjust a drawing temperature by changing the temperature of the electric furnace 35. Meanwhile, for the purpose of rolling thus heated optical lens preform 40 through drawing, feeding rollers 90 which feed the preform 40 into the electric furnace 35 and pulling rollers 33 are used. For drawing of the optical lens preform whose shape is semi-cylindrical as described above, as the pulling rollers 33 firmly hold the pair of drawn side flat surface portions 44 from the both sides, the optical lens preform 40 which is being drawn is prevented from twisting.

When it is determined that the outer diameter of the optical lens preform 40 has become a desired outer diameter (0.5 through 15 mm) as a result of the drawing process, cutters 37 which are disposed below the pulling rollers 33 cut the optical lens preform 40. A wire diameter measuring apparatus 38 disposed in front of the pulling rollers 33 makes this determination. The wire diameter measuring apparatus 38 comprises a laser part which emits laser light, a light receiver part which receives laser light which has passed through the optical lens preform 40, and an analyzer part which calculates the outer diameter of the optical lens preform 40 from the amount of light received by the light receiver part, etc. A preform 50 obtained as a result of the severance by the cutters 37 is shaped like a rod whose length is 5 mm through 2000 mm. This preform 50 is cut into a desired length and ground, whereby an optical lens is obtained (an optical lens fabrication step). The preform 50 easily breaks when too long, but it is inconvenient to cut and grind when too short. The paired side flat surface portions 44, edge portions 48 and the like other than the first curved portion 43 (the optically functioning part) may be polished into desired sizes. While thus drawn material is wound around a drum or the like for production of an optical fiber, etc., making of an optical lens is characterized in that thus drawn material is cut to obtain the preform 50.

The optical lens 1 fabricated in this manner, owing to the characteristics of the drawing process, has the same cross sectional shape as the to-be-drawn optical lens preform 40. Since it is not necessary to mold the optically functioning part 43 when the material is still a very small drawn element, the burden upon making is reduced. In addition, since the optical lens preform 40 comprises the paired beveling surfaces 75 according to the first preferred embodiment (and similarly in preferred embodiments described below), the manufactured optical lens 1 has only a suppressed drawing-induced distortion if any. In the optical lens 1, as shown in FIG. 2B, outgoing light 7 is emitted after the optically functioning part 43 disposed on the light outgoing side has collimated or converged incident light 6.

Figure 3:
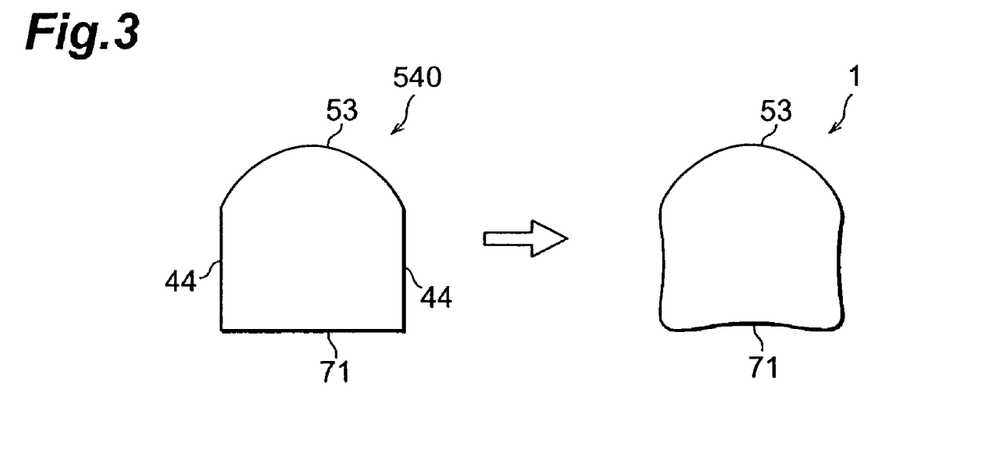
FIG. 3 is a cross sectional view of a optical lens preform according to a comparison example and a cross sectional view of an optical lens which is fabricated by drawing the optical lens preform.

FIG. 3 is a cross sectional view of a optical lens preform according to a comparison example and a cross sectional view of an optical lens which is fabricated by drawing this optical lens preform. A optical lens preform 540 whose cross section is shown on the left-hand side in FIG. 3 comprises a curved portion 53 which is convex and on one side, the flat surface portion 71 which is formed on the opposite side to the curved portion 53, and the paired side flat surface portions 44 which are disposed between curved portion 53 and the flat surface portion 71. The paired side flat surface portions 44 are parallel to each other.

A characteristic of the drawing step is that as the preform is heated, the cross sectional shape of the preform is deformed at other than an optimal temperature and an optimal feeding speed. In other words, as shown on the right-hand side in FIG. 3, the paired side flat surface portions 44, the flat surface portion 71 and the corners of these of the optical lens preform 540 deform at the drawing step. These deform differently depending on a drawing environment, and shown in FIG. 3 is an example where these have hollowed. For clarity of illustration, these deformations at the drawing step are highlighted in FIG. 3 (and also in FIG. 4 and FIG. 5).

Figure 4A:
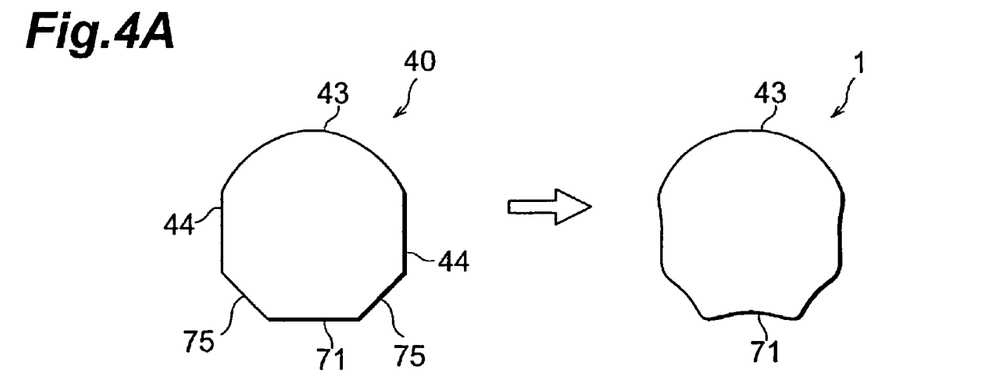
FIG. 4A and FIG. 4B are cross sectional views of the optical lens preform according to the first preferred embodiment and an optical lens which is fabricated by drawing this optical lens preform.
Figure 4B:
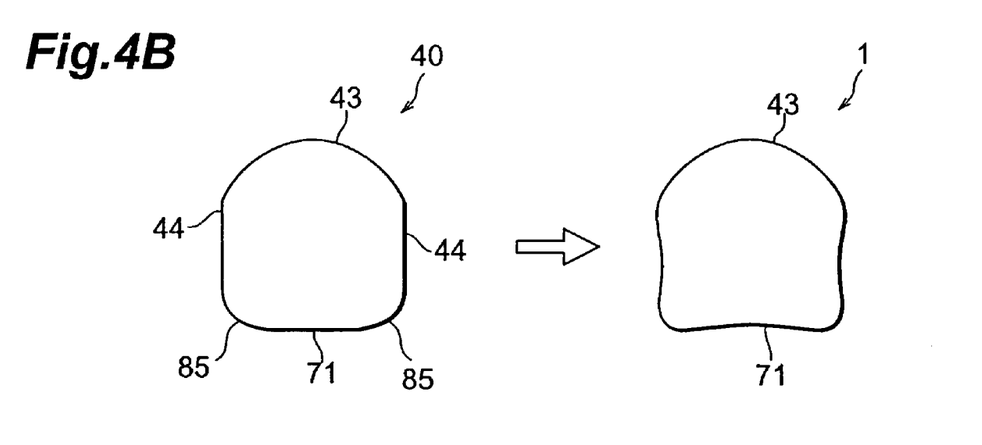

FIG. 4A and FIG. 4B are cross sectional views of the optical lens preform according to the first preferred embodiment and an optical lens which is fabricated by drawing this optical lens preform. As shown on the left-hand side in FIG. 4A, the first curved portion 43 (aspheric surface) which will become the optically functioning part after drawing is on one side of the to-be-drawn optical lens preform 40 according to the first preferred embodiment. A flat surface portion 71 exists on the opposite side to the first curved portion 43. Further, there are the paired side flat surface portions 44 which are parallel to each other between the first curved portion 43 and the flat surface portion 71. In addition, there are paired beveling surfaces 75 on the both sides of the flat surface portion 71. As shown on the left-hand side in FIG. 4B, the paired beveling surfaces of the optical lens preform 40 according to the first preferred embodiment may be curved surfaces (the paired beveling surfaces 85).

According to the first preferred embodiment, as shown on the right-hand side in FIG. 4A and FIG. 4B, the paired beveling surfaces 75 are formed in advance in the optical lens preform 40 and the shape of the preform accordingly becomes close to a cylindrical shape, so that it is possible to suppress a drawing-induced distortion better than that shown in FIG. 3. In the case of the optical lens preform 40 which is shown in FIG. 4B, since the beveling surfaces are curved further (beveling surfaces 85), a distortion is even less likely. Further, since the curvature of the first curved portion 43 which is formed as an aspheric surface is sufficiently large, a drawing-induced distortion does not easily develop (except in the corner portions as described later), thus suppressing damage on the aspheric shape during drawing (which is also similar to the optical lens preforms 140 and 240 shown in FIG. 5 and FIG. 6). As a distortion is thus suppressed, the optical lens 1 whose optically functioning part 43 is formed as designed is obtained.

Figure 5A:
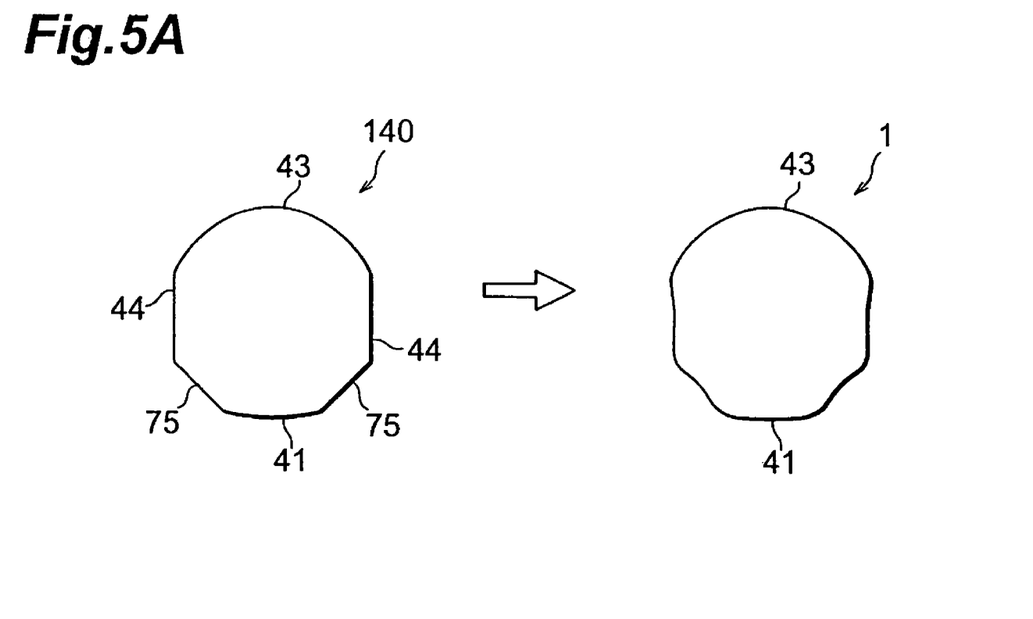
FIG. 5A and FIG. 5B are cross sectional views of a optical lens preform according to a second preferred embodiment and an optical lens which is fabricated by drawing this optical lens preform.
Figure 5B:
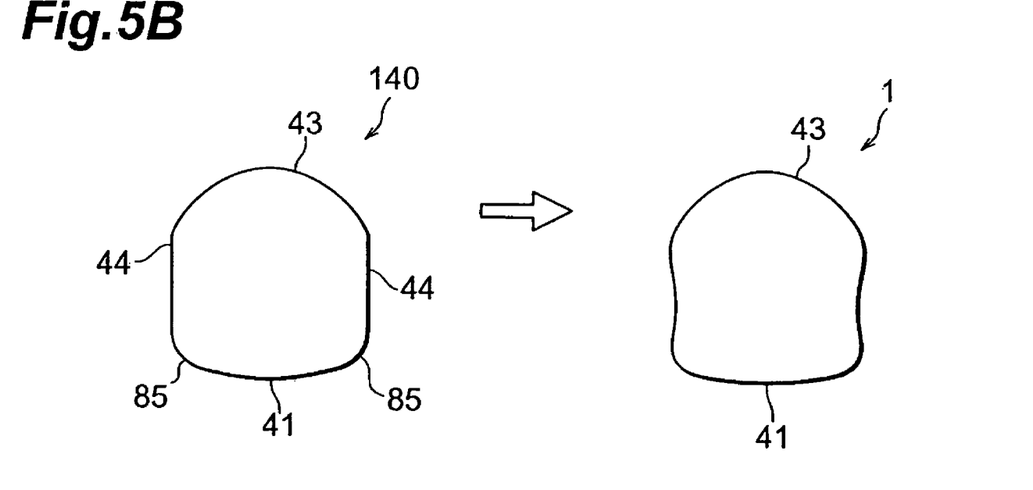

FIG. 5A and FIG. 5B are cross sectional views of a optical lens preform according to a second preferred embodiment and an optical lens which is fabricated by drawing this optical lens preform. As shown on the left-hand side in FIG. 5A and FIG. 5B, in the to-be-drawn optical lens preform 140 according to the second preferred embodiment, the flat surface portion 71 of the optical lens preform 40 according to the first preferred embodiment is replaced with a second curved portion 41 (which is a convex curved surface) whose curvature is smaller than that of the first curved portion 43 which is a spherical surface. This makes the overall shape closer to a cylindrical column, and hence, it is possible to better suppress a drawing-induced distortion (the right-hand side in FIG. 5) than shown in FIG. 3 wherein the flat surface is used. The second curved portion 41 functions also as an optically functioning part which functions in response to light. Making of the optical lens preform 140 is designed considering an optical function of the second curved portion 41.

When a convex curved surface is disposed each on the light incident side and the light outgoing side in this manner, there is a further advantage that owing to a function of the curved surface on the light incident side, a location from a light source may be lengthened by the equivalent distance. Further, when the curvatures of the two curved portions are changed, a distance from the light source can be adjusted.

Figure 6A:
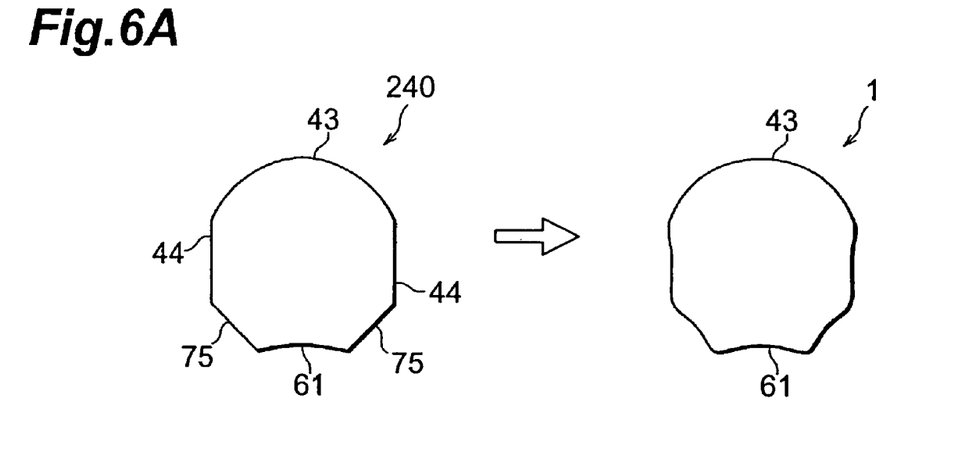
FIG. 6A and FIG. 6B are cross sectional views of a optical lens preform according to a third preferred embodiment and an optical lens which is fabricated by drawing this optical lens preform.
Figure 6B:
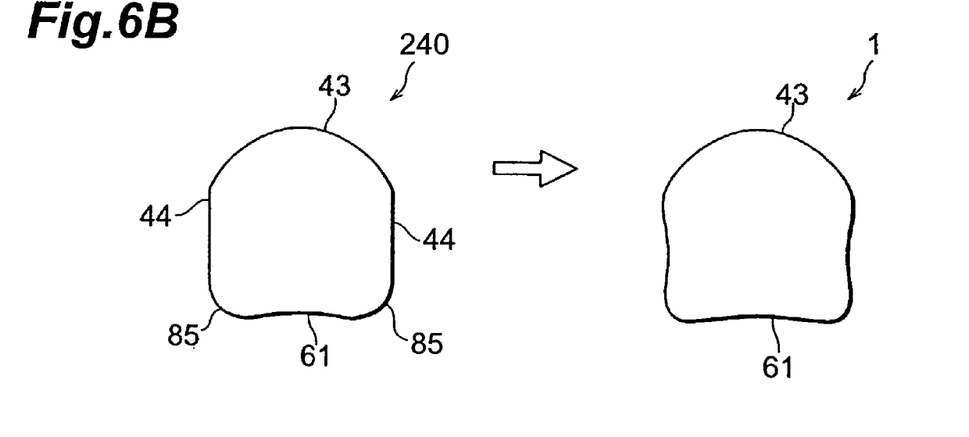

FIG. 6A and FIG. 6B are cross sectional views of a optical lens preform according to a third preferred embodiment and an optical lens which is fabricated by drawing this optical lens preform. As shown on the left-hand side in FIG. 6A and FIG. 6B, in the to-be-drawn optical lens preform 240 according to the third preferred embodiment, the second curved portion (a convex curved surface) 41 of the optical lens preform 140 according to the second preferred embodiment is replaced with a second curved portion (a concave curved surface) 61 whose curvature is smaller than that of the first curved portion 43 which is a spherical surface. As shown on the right-hand side in FIG. 6, the preform is formed into a hollowed shape in advance, and therefore, it is possible to suppress a drawing-induced distortion better than that shown in FIG. 3.

Patent Gazette No. 3121614 reveals a optical lens preform like that shown in FIG. 3 which comprises a curved surface on one side and a flat surface on the other side. When such a preform is drawn, the flat surface portion is largely deformed at the drawing step as described above, which in turn alters an optical characteristic of a fabricated optical lens.

The same gazette also discloses a optical lens preform which is formed to have the same curved surface shape on the both sides. When these curved surfaces are formed as aspheric surfaces, since the curvature of the curved surface portions on the outer side is smaller than that on the inner side, corner portions of the side flat surface portions are sharper than where these curved surfaces are formed as spherical surfaces. This gives rise to a problem that the shape of these corner portions easily deform at the drawing step (or that the shape easily deforms as if they were pulled toward the inner side of the curved surface portions whose curvature is large). Since the aspheric surfaces are disposed in an attempt to improve optical characteristics, when these portions are deformed, an optical characteristics of a fabricated optical lens are harmed. In the case of the optical lens preform according to this preferred embodiment, since the beveling surfaces 75 and 85 are formed in advance on the corner portions of the second curved portions 41 and 61 as described above, the corner portions of the second curved portions 41 and 61 which are the curved surfaces on one side do not easily become distorted. As described later, the beveling surfaces 75 and 85 formed on the corner portions of the second curved portions 41 and 61 will not lead to a problem related to optical characteristics (i.e., a problem related to an effective area of a lens).

FIG. 7 is a drawing which shows an optical function of the optical lens according to the first preferred embodiment. Light irradiated from a laser light source 25 (incident light 6: divergent light) impinges upon the flat surface portion 71, and is then emitted (outgoing light 7) after being collimated by the optically functioning part 43 which is disposed on the light outgoing side. As shown in FIG. 7, used as a light incident surface of the optical lens 1 is the side surface on which side the paired beveling surfaces 75 exist (i.e., the flat surface portion 71). Thus, when the optical lens 1 is used, an outer rim portion of the light incident surface side is never used as an optically functioning part on the light incident side, the paired beveling surfaces 75 formed on the both sides will not lead to a reduction in a lens effective area of the optical lens 1 but instead makes it possible to effectively utilize the lens effective area of the optical lens 1.

While the foregoing has specifically described the present invention in relation to the first through the third preferred embodiments, for implementation, the present invention is not limited to each one of these preferred embodiments, but may be modified as to the shapes, the sizes, the arrangements, the structures and the like while covering all modifications to the invention which are within the claimed scope of the invention.

INDUSTRIAL APPLICABILITY

The method for making an optical lens according to the present invention allows to determine the shape of the optical lens, and the shape of the optically functioning part in particular when the material is still a pre-drawn preform, and hence, it is possible to process the preform in a sufficiently large size, thereby permitting to easily and accurately form the shape of the optical lens and the shape of the optically functioning part in particular. It is also possible to reduce the burden upon making.

In addition, since the optical lens preform comprises the beveling surfaces, it is possible to suppress a drawing-induced distortion of the preform. This realizes an optical lens which comprises an optically functioning part which accurately functions in response to light.

The invention claimed is:

1. A method for making an optical lens, comprising:
an optical lens preform fabrication step of fabricating the optical lens preform which is formed by a transparent material and into the shape of a column, the optical lens preform fabrication step including:
   forming a first curved portion on one side;
   forming a second curved portion on the opposite side to said first curved portion and which has a smaller curvature than that of said first curved portion; and
   forming paired beveling surfaces along a column axis direction on the both sides of said second curved portion;
a drawing step of drawing said optical lens preform fabricated at said optical lens preform fabrication step until said optical lens preform has obtained a desired outer diameter; and
an optical lens fabrication step of cutting said optical lens preform drawn at said drawing step and accordingly fabricating an optical lens,
wherein said first curved portion of said optical lens preform drawn at said drawing step functions as an optically functioning part which functions in response to incident light or outgoing light.

2. A method for making an optical lens, comprising:
a drawing step of drawing an optical lens preform until said optical preform has obtained a desired outer diameter, the optical lens preform being formed by a transparent material and into the shape of a column, the optical lens preform including:
   a first curved portion which is formed on one side;
   a second curved portion which is formed on the opposite side to said first curved portion and which has a smaller curvature than that of said first curved portion; and
   paired beveling surfaces which are formed along a column axis direction on the both sides of said second curved portion;
an optical lens fabrication step of cutting said optical lens preform drawn at said drawing step and accordingly fabricating an optical lens,
wherein said first curved portion of said optical lens preform drawn at said drawing step functions as optically functioning part which functions in response to incident light or outgoing light.

* * * * *